UNITED STATES PATENT OFFICE 2,535,832

PREPARATION OF NOVEL ESTERS OF BETA-HYDROXY CARBOXYLIC ACIDS BY THE REACTION OF BETA-LACTONES WITH CHLOROPHENOLS

Warren L. Beears, Cleveland, Ohio, assignor to The B. F. Goodrich Company, New York, N. Y., a corporation of New York No Drawing. Application April 18, 1949, Serial No. 88,236

14 Claims. (Cl. 260—479)

This invention relates to the preparation of novel esters of beta-hydroxy carboxylic acids, particularly chlorophenyl hydracrylates, and pertains more specifically to the preparation of such compounds by the reaction of a chlorophenol and a beta-lactone.

It is disclosed in U. S. Patent 2,356,459, to Frederick E. Küng that beta-lactones, that is, lactones or inner esters of beta-hydroxy carboxylic acids may be obtained in good yields by the reaction of a ketene with an aldehyde or ketone. In this manner beta-propiolactone (also called hydracrylic acid lactone) which has the structure

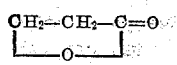

is economically obtained from ketene and formaldehyde.

It is further disclosed in a copending application, Serial No. 620,659, filed October 5, 1945, now Patent No. 2,449,991, that a beta-aroxy carboxylic acid is obtained when a beta-lactone is reacted with a phenol in the absence of added materials, or in the presence of an inert organic diluent, or in the presence of an aqueous solution of a base so as to form a salt of the phenol. Also, it is disclosed in a copending application, Serial No. 19,896, filed April 8, 1948, that phenols, cresols and the like react with beta-lactones to form aryl esters of beta-hydroxy carboxylic acids.

I have now discovered that when a beta-lactone is reacted with a chlorophenol in the presence of a catalytic amount of a strong mineral or inorganic acid, reaction occurs at the beta-carbon atom of the beta-lactone to form a chlorophenyl ester of beta-hydroxy carboxylic acid; and that this reaction provides a convenient and economical method for preparing numerous useful organic compounds which have not heretofore been prepared.

The novel compounds of this invention possess the general formula

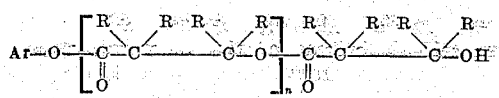

wherein Ar is a chlorophenyl radical which may contain from 1 to 5 chlorine atoms, each R is hydrogen or an alkyl, aryl or cycloalkyl radical containing from 1 to 6 carbon atoms, and $n$ is 0 or 1. The reaction to form the compounds of the above formula where $n$ is 0, proceeds, in general, as represented by the following equation:

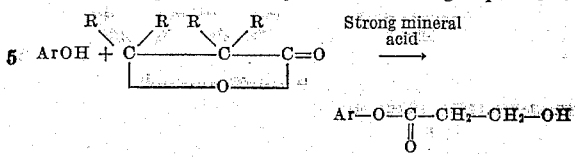

wherein Ar and R have the meaning set forth hereinabove.

The compounds of the above general formula wherein $n$ is 1, are prepared by a secondary reaction involving the self-alcoholysis of the ester first formed by the reaction of the chlorophenol with the beta-lactone. This secondary reaction, which occurs simultaneously with the primary reaction, may be represented as follows:

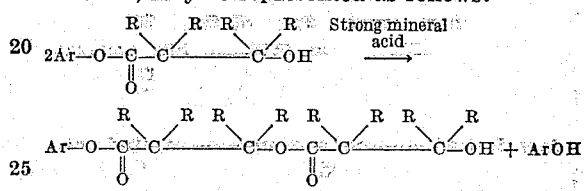

wherein Ar and R are the same as above.

In carrying out the reaction, a preferred procedure involves first adding the strong mineral acid catalyst, such as sulfuric acid, hydrochloric acid, phosphoric acid and the like (preferably in catalytic amounts of approximately 1% by weight based on the weight of the beta-lactone, although amounts as small as .2% or smaller and as high as 4% or even higher may be used advantageously), to the chlorophenol, and then adding the beta-lactone to the chlorophenol-acid mixture with agitation. However, other procedures such as addition of the acid catalyst to a mixture of the chlorophenol and the lactone may also be used. The reaction may also be conducted in an inert solvent or diluent such as hexane, benzene, carbon tetrachloride or the like or even water, although the use of such solvent or diluent is not necessary for the reaction to occur.

In order to recover the reaction products from the reaction mixture, the mineral acid catalyst is neutralized by the addition of a basic material such as an alkali metal alkoxide, inorganic base or other basic substance after which the excess of the chlorophenol, if any, is removed preferably by distillation at reduced pressures. At this point small quantities of solid material, believed to be beta-lactone polymer and resulting from side reactions, may be present and can be easily removed by filtering. The residue is then preferably extracted with an organic solvent such as ether, benzene, and the like and the extract distilled, although, if desired, the residue itself may be distilled at reduced pressures to obtain the products. Compounds resulting from the primary and secondary reactions described above are conveniently separated from one another during the distillation.

By controlling the reaction time the proportionate amounts of the products obtained from the primary and secondary reactions can be conveniently controlled. For example, when reacting beta-propiolactone with a chlorophenol, highest amounts of chlorophenyl hydracrylate are obtained when the time of reaction is relatively short since the secondary reaction of self-alcoholysis is substantially slower than that of the primary reaction to form the chlorophenyl hydracrylate. When the reaction time is increased substantially higher yields of the secondary reaction product, that is, a beta-(carbochlorophenoxy) alkyl hydracrylate, are obtained. Thus, by selecting the proper reaction time, the desired amount of either reaction product can be obtained.

The quantities of the chlorophenol and the beta-lactone used in the reaction are not critical and may be varied widely. The reactants may be brought together in equimolecular proportions (the quantities theoretically required for the reaction), although it is desirable that an excess of the chlorophenol be utilized. Thus, a chlorophenol-beta-lactone ratio of from 3:1 to 6:1 is preferred although the ratio may be as low as 1:1 or as high as 8:1 or even higher.

Other conditions for the reaction such as temperature and pressure are also not critical. Highest yields of the desired products are generally obtained when temperatures of from 30° C. to 70° C. and atmospheric pressure are utilized. However, temperatures as low as 0° C. or lower or as high as 100° C. or even higher are also operative.

Any desired chlorophenol may be reacted with beta-lactones. Included in this class of phenols are ortho-chlorophenol, para-chlorophenol, 2,3-dichlorophenol, 2,4-dichlorophenol, 2,5-dichlorophenol, 2,6-dichlorophenol, 3,4-dichlorophenol, 3,5-dichlorophenol, 2,3,5-trichlorophenol, 2,4,6-trichlorophenol, pentachlorophenol and the like.

Beta-propiolactone, the simplest possible beta-lactone, is the preferred beta-lactone for use in this invention because of the ease with which it reacts with chlorophenols to produce chlorophenyl hydracrylates and because of its low cost. However, other beta-lactones of the general formula,

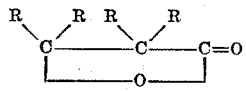

wherein each R is a member of the class consisting of hydrogen and alkyl, aryl and cycloalkyl radicals containing fewer than 7 carbon atoms may be used. Included among the beta-lactones of this general class are saturated aliphatic beta-lactones such as beta-butyrolactone, which gives chlorophenyl esters of beta-hydroxy butyric acid; beta-isobutyrolactone, which gives chlorophenyl esters of beta-hydroxy isobutyric acid; beta-valerolactone, which gives chlorophenyl esters of betay-hydroxy valeric acid; beta-isovalerolactone, which gives chlorophenyl esters of beta-hydroxy isovaleric acid; beta-n-caprolactone, which gives chlorophenyl esters of beta-hydroxy caproic acid; alpha-ethyl-beta-propiolactone, which gives chlorophenyl esters of alphaethyl beta-hydroxy propionic acid; alpha-isopropyl-betapropiolactone, which gives chlorophenyl esters of alpha-isopropyl beta-hydroxy propionic acid; alpha - butyl - beta - propiolactone, which gives chlorophenyl esters of alpha-mutyl-beta-hydroxy propionic acid; alpha-methyl-beta- butyrolactone, which gives chlorophenyl esters of alpha-methyl-beta-hydroxy butyric acid; alpha-ethyl-beta-butyrolactone, which gives chlorophenyl esters of alpha-ethyl-beta-hydroxy butyric acid, and the like.

Beta-lactones containing cycloalkyl and aryl substituents such as beta-cyclohexyl-beta-propiolactone, beta-phenyl-beta-propiolactone, alpha-phenyl-beta-propiolactone and the like may also be used to produce chloro-phenyl esters of the corresponding beta-hydroxy carboxylic acids.

In order further to illustrate the invention the following specific examples are set forth but it is to be understood that the invention is not limited thereto. All parts are by weight.

*Example I*

385 parts (3 moles) of freshly distilled para-chlorophenol and 0.5 part of concentrated sulfuric acid are placed in a glass reaction vessel equipped with a stirrer, and temperature measuring means. This mixture is heated to about 50° C. and 72 parts (1 mole) of beta-propiolactone are added over a twelve minute period, the temperature of the reaction mixture being maintained at about 50° C. by external cooling means. The reaction mixture is stirred for ten minutes and the catalyst neutralized with sodium methoxide. The excess para-chlorophenol is removed by vacuum distillation and the residue is poured into an ether solution. The ether solution is washed with a saturated solution of sodium acid carbonate and with water. Upon distillation of the ether solution 70 parts of para-chlorophenylhydracrylate are obtained. (B. P. 99° C/1mm.; $N_D^{20}$ 1.5332; $d_{20}$ 1.2860), analysis: C, 53.54%; H, 4.63%.

A second fraction, 70 parts, is identified as beta-(carbo-4-chlorophenoxy) ethyl hydracrylate.

*Example II*

Example I is repeated except that ortho-chlorophenol is substituted for the para-isomer. 38 parts of ortho-chlorophenylhydracrylate (B. P. 80–82° C./0.03 mm.; $N_D^{20}$ 1.5283; $d_{20}$ 1.2620, analysis: C, 55.37%; H, 4.91%) are obtained.

81 parts of beta-(carbo-2-chlorophenoxy) ethyl hydracrylate are also obtained as a second fraction.

*Example III*

Example I is repeated substituting beta-butyrolactone for beta-propiolactone. Upon distillation of the reaction mixture, a colorless oil, the para-chlorophenyl ester of beta-hydroxy butyric acid is secured as a first fraction and a second fraction, also an oily material, resulting from self-alcoholysis of the para-chlorophenyl ester of beta-hydroxy butyric acid is obtained. Substantial yields of each product are obtained, although the yields are not so high as in Example I.

Moreover, when other chlorophenols are reacted with beta-lactones in the presence of a strong mineral acid catalyst, chlorophenylhydracrylates and beta-(carbo-chlorophenoxy) alkyl hydracrylates are also obtained. For example, when 2,5-dichlorophenol is reacted with beta-propiolactone in the presence of concentrated hydrochloric acid, 2,5-chlorophenylhyracrylate and beta-(carbo-2,5-chlorophenoxy) ethyl hydracrylate are obtained; when 2,4,6-trichlorophenol is reacted with alpha-butyl-beta-propiolactone in the presence of concentrated sulfuric acid, the 2,4,6-trichlorophenyl ester of alpha-butyl-beta-hydroxy propionic acid and the product resulting from self-alcoholysis of this ester are obtained, and when penta-chlorophenol is reacted with beta-n-caprolactone in the presence of concentrated sulfuric acid, the penta-chlorophenyl ester of beta-hydroxy caproic acid and the product resulting from self-alcoholysis of this ester are obtained. It is to be understood that any of the generic class of chlorophenols will react with any beta-lactone of the general formula

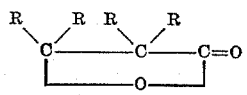

wherein each R is a member of the class consisting of hydrogen and alkyl, aryl and cycloalkyl radicals containing fewer than 7 carbon atoms, in accordance with this invention.

As has been indicated hereinabove, the chlorophenyl hydracrylates, the beta-(carbo-chlorophenyl) alkyl hydracrylates and the other chlorophenyl esters of beta-hydroxy carboxylic acids, are all very valuable chemical compounds. For example, they are useful as solvents and plasticizers for resinous and rubbery materials such as cellulose derivatives, vinyl resins, synthetic rubber and the like. The chlorophenyl hydracrylates are especially useful in that they may be heated in the presence of a dehydrating agent, whereupon a molecule of water is removed to form the corresponding chlorophenyl acrylates which are useful polymerizable materials. In addition, the new compounds of this invention are useful as insecticides, fungicides and herbicides and as chemical intermediates and for many other purposes.

Numerous modifications and variations of the invention will be obvious to those skilled in the art and are included within the spirit and scope of the appended claims.

I claim:

1. The method which comprises reacting a chlorophenol with a beta-lactone of the formula

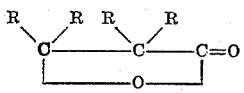

wherein each R is a member of the class consisting of hydrogen and alkyl radicals of fewer than 7 carbon atoms, in the presence of a strong mineral acid catalyst and recovering a compound of the formula

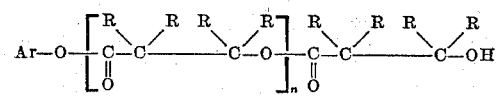

wherein Ar is a chlorophenyl radical, n is a numeral, including zero, less than two and each R has the same meaning as above.

2. The method which comprises reacting a chlorophenol with beta-propiolactone in the presence of a strong mineral acid catalyst and recovering a compound of the formula

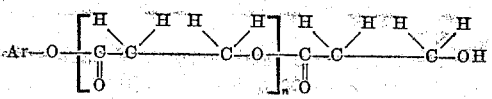

wherein Ar is a chlorophenyl radical and n is a numeral, including zero, less than two.

3. The method which comprises reacting a chlorophenol with beta-propiolactone in the presence of a strong mineral acid catalyst and recovering a compound of the formula

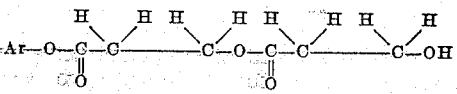

wherein Ar is a chlorophenyl radical.

4. The method which comprises reacting a chlorophenol with beta-propiolactone in the presence of a strong mineral acid catalyst, and recovering a compound of the formula

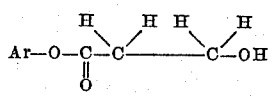

wherein Ar is a chlorophenyl radical.

5. The method which comprises reacting para-chlorophenol and beta-propriolactone in the presence of a strong mineral acid catalyst and recovering para-chlorophenyl hydracrylate.

6. The method which comprises reacting para-chlorophenol and beta-propiolactone in presence of a strong mineral acid catalyst and recovering beta-(carbo-4-phenoxy) ethyl hydracrylate.

7. The method which comprises reacting ortho-chlorophenol with beta-propiolactone in the presence of a strong mineral acid catalyst and recovering ortho-chlorophenyl hydracrylate.

8. The method which comprises reacting ortho-chlorophenol with beta-propiolactone at a temperature of from 40° C. to 60° C. and in the presence of a sulfuric acid catalyst, and distilling the reaction product to recover ortho-chlorophenyl hydracrylate and beta-(carbo-2-chlorophenoxy) ethyl hydracrylate.

9. A new chemical compound of the formula

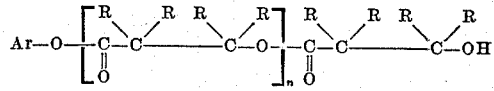

wherein Ar is a chlorophenyl radical, each R is a member of the class consisting of hydrogen and alkyl radicals of fewer than 7 carbon atoms, and n is a numeral, including zero, less than two.

10. A new chemical compound of the formula

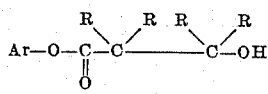

wherein Ar is a chlorophenyl radical, and each R is a member of the class consisting of hydrogen and alkyl radicals of fewer than 7 carbon atoms.

11. A new chemical compound of the formula

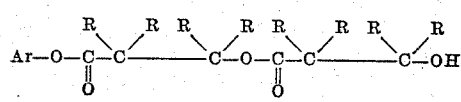

wherein Ar is a cholorophenyl radical, and each R is a member of the class consisting of hydrogen and alkyl radicals of fewer than 7 carbon atoms.

12. As a new chemical compound para-chlorophenyl hydracrylate of the formula

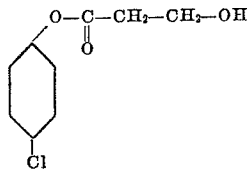

13. As a new chemical compound beta-(carbo-4-chlorophenoxy) ethyl hydracrylate of the formula

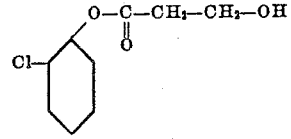

14. As a new chemical compound ortho-chlorophenyl hydracrylate of the formula

WARREN L. BEEARS.

No references cited.